May 30, 1950     G. M. BARNES     2,509,955
CENTER PLATE CONSTRUCTION

Filed Nov. 12, 1947

INVENTOR
Gladeon M. Barnes.
BY Maurice A. Crews
ATTORNEY

Patented May 30, 1950

2,509,955

UNITED STATES PATENT OFFICE 2,509,955

CENTER PLATE CONSTRUCTION

Gladeon M. Barnes, Philadelphia, Pa., assignor to The Budd Company, Philadelphia, Pa., a corporation of Pennsylvania Application November 12, 1947, Serial No. 785,350

1 Claim. (Cl. 105—199)

The invention relates to railway rolling stock and, more particularly, to the truck and car body center plate arrangement.

It is among the objects of the invention to improve the riding qualities of a railway car by providing, in effect, additional springing between the truck and car body, to reduce the vibrations which are transmitted from the truck to the car body and also to insulate the car body from the noises produced by the truck in travelling over the rails.

These objects are attained by interposing a rubber cushion or cushions between the truck and body center plate to cushion the ordinary or normal loading between these plates in all directions. To obtain greater vertical springing, the arrangement provides a rubber annulus between telescoping parts of such plates in such manner as to place the rubber annulus taking the vertical loading partly in shear and partly in compression. This rubber annulus also cushions the lateral shocks or loading between said plates with the rubber in compression and tension. For extremely heavy or abnormal vertical loading, protection is afforded the rubber annulus by providing an additional rubber cushion between the center plates which comes into play only to carry some of the vertical loading in compression in the event of such abnormal loading.

The rubber annulus is further of such mass that it permits the necessary relative turning of the truck and body center plates by placing the rubber annulus in torsional shear. Thus the rubber tends, after such relative turning, to return the truck and body to their longitudinally aligned positions.

The arrangement is further designed to protect the rubber against overstressing both in the vertical and lateral directions by providing positive metal-to-metal transfer of excessive shocks between the parts.

The foregoing and other and further objects and advantages and the manner in which they are attained will become clear from the following detailed description when read in connection with the drawings forming a part of this specification.

Figure 1:
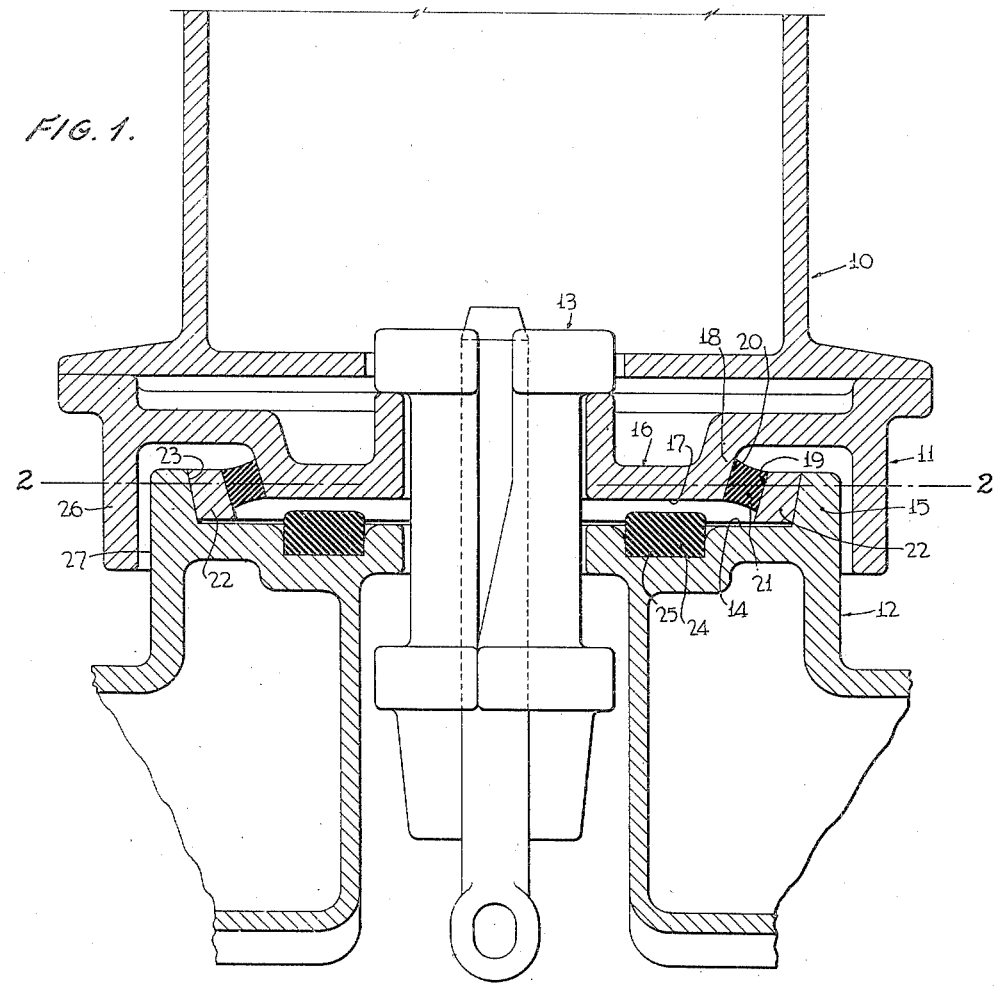
Figure 2:
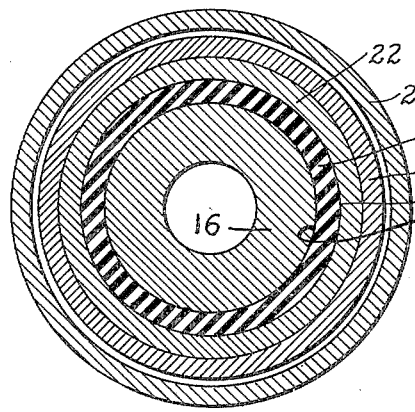

In the drawings, Fig. 1 is an axial section through the assembled truck and body center plates showing the invention applied thereto; and Fig. 2 is a sectional plan view, on a reduced scale, the section being taken approximately along the line 2—2 of Fig. 1, the usual king pin having been omitted in this view.

In the form of the invention shown, the car body center plate, carried by the body underframe 10 in a usual manner, is designated generally by the numeral 11, and the truck center plate, by the numeral 12. The two center plates are shown as held against separation by a usual form of king pin designated generally as 13 and passing freely through aligned holes in the respective plates.

The truck center plate 12 is shown as having a flat face 14 surrounded by an upwardly projecting annular flange 15. The body center plate 11 has a central protruding portion 16 provided with a flat face 17 surrounded by a generally axially extending annular portion 18 designed to telescope within the upstanding flange 15 of the truck center plate.

Between the faces 19 and 20 on the opposed telescoping portions of the respective center plates is inserted a rubber annulus 21. The faces 19 and 20 are inclined at an angle of approximately 18° from the vertical, and the rubber is firmly bonded to these faces as by vulcanizing.

For ease of manufacture and assembly, the face 19 on the truck center plate is preferably formed on a separate ring 22 which fits an inclined or frustro-conical seat 23 on the upstanding flange 15 and is held by this interfitting engagement against rotary movement with respect thereto so that it forms, in effect, a fixed part of the truck center plate when the parts are in assembled relation. This frusto-conical interseating engagement permits the body and truck center plates to be readily brought together in assembled relation or separated when desired.

From the foregoing description, it will be seen that the rubber annulus carries the vertical loads between the truck and body center plates largely in shear but partly in compression, and the mass of the rubber is so chosen as to enable it to carry the normal such loading.

The invention contemplates, however, the provision of additional rubber cushioning between the truck and body center plates which will come into play only upon excessive loading, after which it will assist the rubber annulus in carrying such excessive loads by the rubber in compression. Such additional rubber cushion may comprise an annulus of rubber 24 set within a recess 25, larger than said annulus, in the flat face 14 of the truck center plate and projecting some distance beyond said face to be engaged, upon such excessive loading when the rubber is distorted into the free space of the recess, by the flat face 17 on the body center plate.

The rubber annulus 21 also acts to cushion the relative lateral movements between the two center plates with the rubber mass mainly in compression and tension.

The arrangement also provides safety means which prevents overstressing of the rubber upon excessive shocks being transmitted between the center plates. To prevent such overstressing in vertical direction, the opposed flat faces 14 and 17 are spaced apart such distance that they come into metal-to-metal engagement before the rubber of the annulus 21 is overstressed by abnormal and excessive shocks. To provide a more extensive such metal-to-metal engagement, the upstanding flange 15 may be spaced a similar distance from the opposite face of the body center plate so that it will engage said face simultaneously with the engagement of faces 14 and 17.

To prevent such overstressing in lateral direction, the body center plate is provided with an annular flange 26 telescoping over the outer cylindrical face 27 of the truck center plate. These parts are normally spaced apart such a distance that they come into metal-to-metal engagement before the rubber of the annulus 21 is overstressed by excessive or abnormal shocks in lateral direction.

It will be understood that the king pin and center holes of the truck and body center plates are provided with the necessary clearances to permit the necessary vertical, horizontal and rotary cushioning movements.

The term "rubber," as used herein, is to be interpreted broadly as including not only natural rubber and its compositions but also the various synthetic rubbers and their compositions having the desired characteristics.

It will be understood that the dimensions and sizes of the rubber are but illustrative, being more or less diagrammatically shown. They will obviously be varied in accordance with the loads imposed with due regard to factors of safety, etc., as required by good engineering practice.

While the invention has been herein described in detail, in connection with a specific embodiment thereof, it will be understood that changes and modifications may be made by those skilled in this art which do not depart from the main features of the invention, and such changes and modifications are intended to be covered in the appended claim.

What is claimed is:

In combination, a truck center plate and a car body center plate having annularly spaced telescoping parts, one of said parts having an inclined or frusto-conical seat, a ring fitting said seat and a rubber annulus interposed between the other of said parts and said ring and secured thereto through annular faces on said other of said parts and said ring, which faces are similarly inclined to the vertical and of frusto-conical form, said rubber annulus being designed normally to carry the entire vertical loading between said plates with the rubber of the annulus partly in shear and partly in compression.

GLADEON M. BARNES.

REFERENCES CITED

The following references are of record in the file of this patent:

UNITED STATES PATENTS

| Number | Name | Date |
|---|---|---|
| 1,810,718 | Lord | June 16, 1931 |
| 1,923,740 | Tatum | Oct. 3, 1933 |
| 2,023,756 | Brownyer | Dec. 10, 1935 |
| 2,045,510 | Armington | June 23, 1936 |
| 2,099,031 | Neal et al. | Nov. 16, 1937 |
| 2,258,640 | Beckette | Oct. 14, 1941 |
| 2,272,426 | Nystrom et al. | Feb. 10, 1942 |

FOREIGN PATENTS

| Number | Country | Date |
|---|---|---|
| 170,665 | Switzerland | July 15, 1934 |
| 303,972 | England | Jan. 17, 1929 |
| 566,697 | Germany | Dec. 22, 1932 |